United States Patent

[11] 3,622,735

[72] Inventor Albert Bruce Mainwaring
 Phoenixville, Pa.
[21] Appl. No. 55,208
[22] Filed July 15, 1970
[45] Patented Nov. 23, 1971
[73] Assignee Uniform Tubes, Inc.
 Collegeville, Pa.
 Continuation-in-part of application Ser. No. 29,876, Apr. 20, 1970. This application July 15, 1970, Ser. No. 55,208

[54] NONTREPANNING NONROTARY ELECTRODE FOR ELECTROEROSION OF METALS
14 Claims, 19 Drawing Figs.

[52] U.S. Cl. ........................................... 219/69 E
[51] Int. Cl. ............................................ B23p 1/08
[50] Field of Search ............................... 219/69 E, 69 V

[56] References Cited
UNITED STATES PATENTS
2,945,936 7/1960 Carman ..................... 219/69 E
2,385,665 9/1949 Warwick .................... 219/69 V Primary Examiner—Ralph F. Staubly
Attorney—McClure & Millman ABSTRACT: An electrode for forming holes in metal workpieces by electroerosion in which a solid helical member is secured in a substantially cylindrical tubular outer member to provide helical through passages for the dielectric fluid which change and appear to rotate around the central axis of the electrode as the active end of the electrode is consumed so that substantially no buildup of a central plug in the workpiece occurs due to trepanning. The invention also includes electroerosion apparatus and an electroerosion method using the nontrepanning electrode.

PATENTED NOV 23 1971

INVENTOR.
ALBERT BRUCE MAINWARING

BY
McClure & Millman
ATTORNEYS.

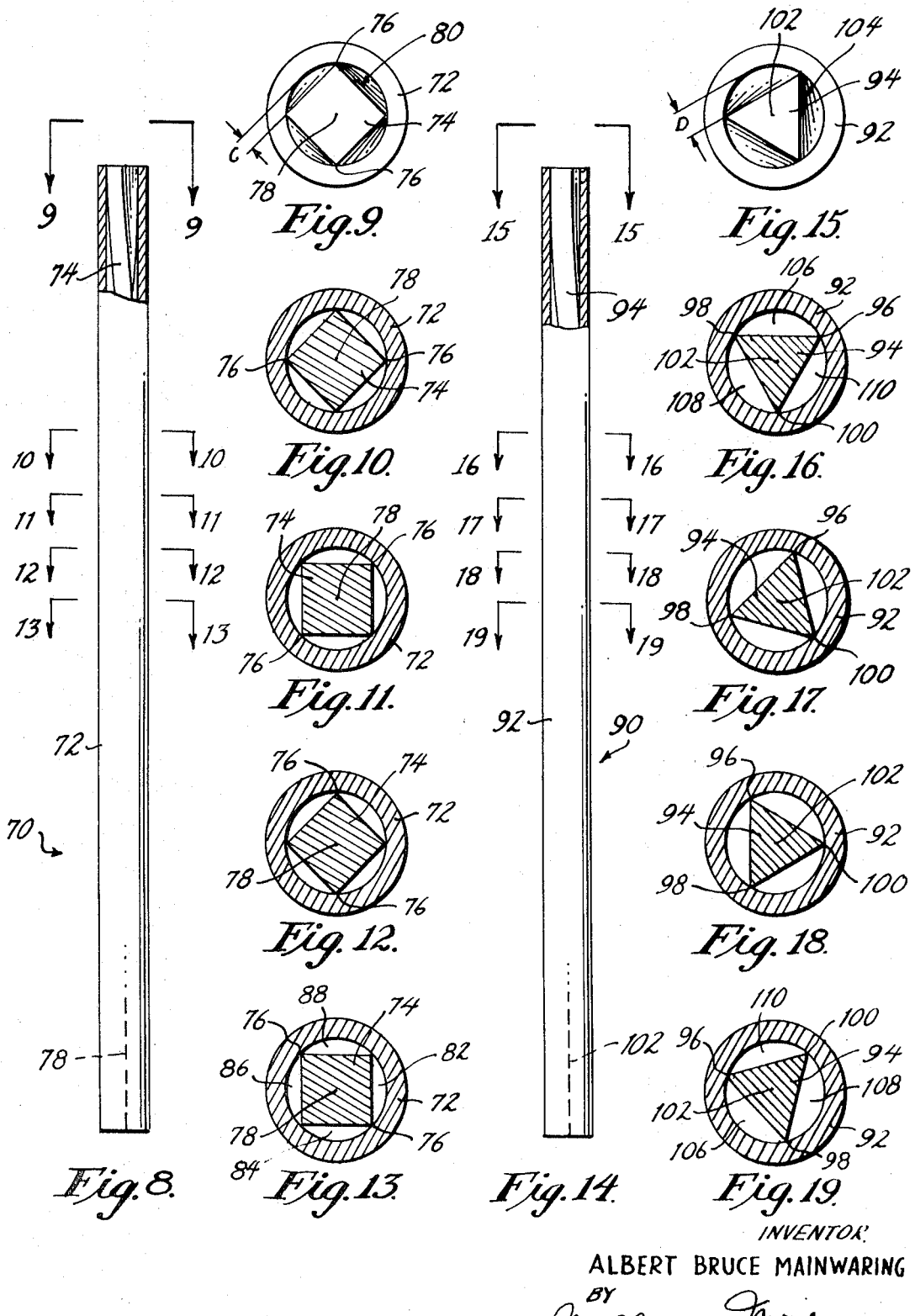

NONTREPANNING NONROTARY ELECTRODE FOR ELECTROEROSION OF METALS

This application is a continuation-in-part of my copending application Ser. No. 29,876 filed Apr. 20, 1970 and relates to the electroerosion of metals and more particularly to a nonrotary electrode for use with electroerosion apparatus.

Electroerosion of metal workpieces to form blind or through holes therein is conventionally accomplished by applying a series of time-spaced spark discharges between a tubular rotary electrode and a workpiece. A dielectric fluid passes through the axial bore of the electrode to cool the electrode, whose tip or active end is consumed during the erosion process, and to flush out the debris or eroded metal in the annular space formed between the outer diameter of the electrode and the diameter of the hole being formed in the workpiece. The electrode is rotated and fed toward the workpiece as the erosion progresses.

The use of a dielectric fluid passage or bore which is coaxial with the electrode causes the formation by trepanning of a central plug or core in the hole forming in the workpiece which approximates the diameter of the electrode bore. This renders the electroerosion process inefficient since the plug or core must be subsequently removed, if a blind hole is formed, by mechanical means which are not only time consuming but often difficult to accomplish. In the case of the formation of deep through holes, trepanning inhibits continued electroerosion.

The prior art has recognized this trepanning problem and has suggested solving the same by the use of a rotary electrode with an eccentric bore as in the U.S. Pat. of Dixon et al. No. 2,818,490 and Adcock No. 2,902,585. An eccentric bore is one which is offset from the longitudinal axis of the electrode so that its cross-sectional area is located between the central axis of the electrode and a wall of the electrode as shown in FIGS. 4-7 of Dixon et al. Such an eccentric bore necessarily thins the wall of the electrode and is difficult to manufacture efficiently.

Additionally, where it is necessary to provide many holes of relatively small diameter or many holes which are closely spaced, as the through holes in turbine blades for the passage of cooling air, it is not possible to use rotary electrodes.

It is the primary object of this invention to provide an electrode which prevents the formation of a central plug by trepanning but which is at the same time nonrotary, so that it can be used efficiently in those applications, as mentioned hereinbefore, where a rotary electrode cannot be used.

Another object is to provide a nonrotary electrode having helical bores for the passage of a dielectric fluid formed by encompassing a solid helical member within a substantially cylindrical tube so that the buildup by trepanning of a central plug is prevented because the location of the dielectric fluid passages changes and appears to rotate as the active end or tip of the electrode is consumed in the electroerosion process.

Another object is to provide a nontrepanning nonrotary electrode formed of a tubular member with a helical insert to provide for an increased flow of dielectric fluid to the workpiece while preventing trepanning.

Another object of the invention is to provide a nontrepanning nonrotary electrode of the character described in which the formation of V-shaped holes in the workpiece is avoided.

Another object is to provide a nonrotary electrode of the character described in which a plurality of passages for the dielectric fluid are formed in the electrode without thinning the electrode wall of the outer tubular member and by an efficient and economical manufacturing technique.

These and other objects of the invention will become more apparent as the following description proceeds in conjunction with the accompanying drawings, wherein:

FIG. 8 is an elevational view partly in section and similar to FIG. 2 of another form of the nonrotary electrode;

FIG. 9 is an elevation view taken from the line 9—9 of FIG. 8;

FIG. 10 is a sectional view taken on the line 10—10 of FIG. 8;

FIG. 11 is a sectional view taken on the line 11—11 of FIG. 8;

FIG. 12 is a sectional view taken on the line 12—12 of FIG. 8;

FIG. 13 is a sectional view taken on the line 13—13 of FIG. 8;

FIG. 14 is an elevational view partly in section and similar to FIG. 2 of yet another form of the electrode;

FIG. 15 is an elevational view taken from the line 15—15 of FIG. 14;

FIG. 16 is a sectional view taken on the line 16—16 of FIG. 14;

FIG. 17 is a sectional view taken on the line 17—17 of FIG. 14;

FIG. 18 is a sectional view taken on the line 18—18 of FIG. 14; and

FIG. 19 is a sectional view taken on the line 19—19 of FIG. 14.

Specific reference is now made to the drawings in which similar reference characters are used for corresponding elements throughout.

Figure 1:
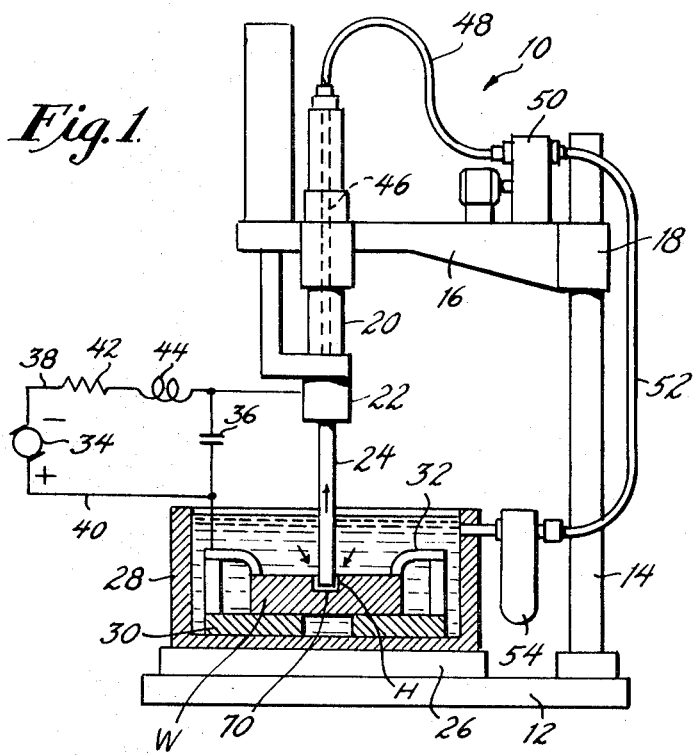
FIG. 1 is an elevational view partly diagrammatic and partly in section, of an electroerosion apparatus employing the nonrotary electrode of the instant invention.
Figure 2:
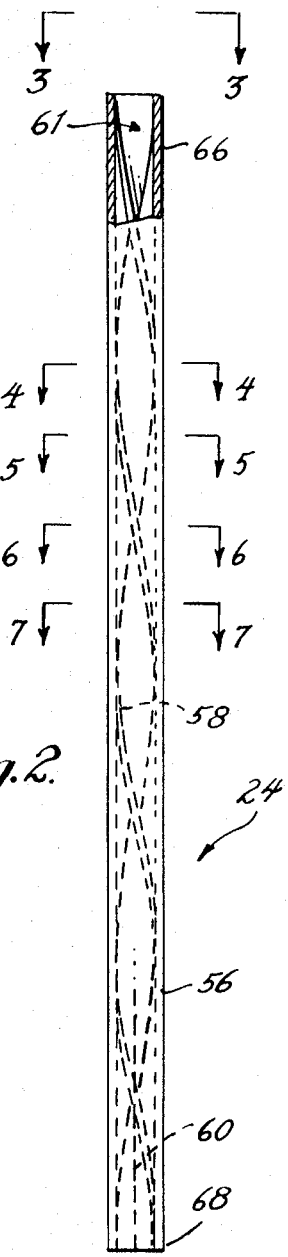
FIG. 2 is an elevational view, partly broken away and in section, of one form of nonrotary electrode with the helical insert shown diagrammatically.
Figure 3:
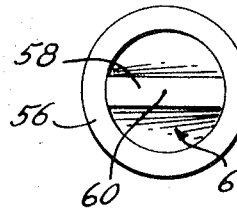
FIG. 3 is an elevational view taken from the line 3—3 of FIG. 2.
Figure 4:
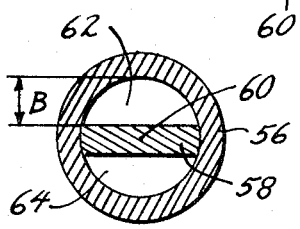
FIG. 4 is a sectional view taken on the line 4—4 of FIG. 2.
Figure 5:
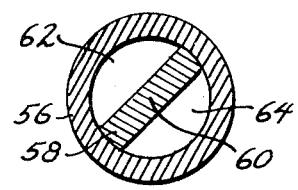
FIG. 5 is a sectional view taken on the line 5—5 of FIG. 2.
Figure 6:
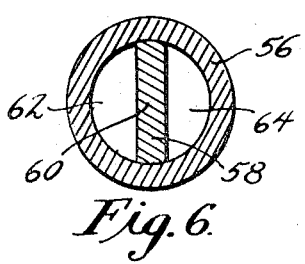
FIG. 6 is a sectional view taken on the line 6—6 of FIG. 2.
Figure 7:
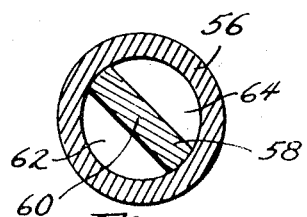
FIG. 7 is a sectional view taken on the line 7—7 of FIG. 2.

Referring first to FIG. 1 and the electroerosion apparatus 10 shown therein, it comprises a mechanical and an electrical unit. The mechanical unit includes a base 12 upon which an upright post 14 is mounted which carries a lateral arm 16 which is vertically adjustable by means of a clamp 18. The arm 16 carries a spindle 20 whose lower end is equipped with a chuck 22 for removably retaining the upper shank or inoperative end of the elongated electrode 24 of the instant invention made of brass, copper and the like metals.

Mounted on the base 12 over an insulating pad 26 is a dielectric fluid container 28 which is equipped with a mounting block 30 having dogs 32 which secure the workpiece W, such as steel and the like metals.

A variety of electrical circuits may be utilized to supply spark discharges between the operative end of the electrode 24 and the workpiece W. For illustrative purpose the circuit shown in FIG. 1 comprises a direct current source 35 and a condenser 36 which is charged from the source via conductors 38 and 40 which include a resistor 42 and an inductance 44. The conductor 38 from the negative side of the source is connected to the chuck 22 while the conductor 40 from the positive side is connected to workpiece holder 32.

The spindle 20 is nonrotary and can be raised and lowered or infed towards the workpiece W to maintain an appropriate spark gap by raising and lowering the arm 16 or by raising or lowering the spindle itself using means as is conventionally employed in a drill press.

To circulate dielectric fluid through the passage in the electrode to cool the same and remove dislodged particles from the workpiece, the spindle 20 of provided with a bore 46 which communicates with the electrode and which is connected via a conduit 48 with the suction side of a pump 50, the delivery side of which is connected via a conduit 52 and a filter unit 54 to the container 28.

Coming first to the electrode shown in FIGS. 2-7, the electrode 24 consists essentially of an outer substantially cylindrical tubular member or sleeve 56 of predetermined wall thickness providing an axial through bore, and an inner core member in the form of a solid bar 58 encased and retained in the outer tubular member. The inner core member 58 is elongated and helical and extends coaxially within the outer tubular member 56 to thereby provide, in effect, two separate helical, axially extending, dielectric fluid passages characterized by the fact that at any given transverse direction or cross section, as seen in FIGS. 4–7, the bar extends diametrically through the axis 60 of the tubular member, the ends of which contact the inner wall surface of the outer tubular member at diametrically opposite points while the sides of the bar are spaced from the inner surface of the outer tubular member. Thus, the two helical passages generate segments 62 and 64 between each side of the bar 58 and the corresponding inner surface of the outer tubular member 56, when a cross section, is taken through the outer tubular member and the insert bar.

While, for the sake of simplicity and ease of manufacture, the entire length of the electrode is comprised of the inner core member or bar 58 and the outer tubular member 56 with the helical passages extending throughout the entire length of the electrode from its inoperative upper end 66, which is nonrotatably mounted in the chuck 22, to its lower operative or active end 68, it is understood that the helical passages can be confined to a reasonable length at the active end 68, in which case the inner core member 58 can terminate short of the upper end 66 of the electrode, which end will thus consist only of the outer tubular member or sleeve.

In use during the electroerosion in which the electrode is not rotated but simply infed towards the workpiece W to maintain a desired spark gap, a hole H is formed while the active end 68 of the electrode is consumed, i.e., both the inner core member 58 and the outer tubular member 56 are consumed. During such consumption, as shown in FIGS. 4–7, the position of the helical passages around the central axis 60 of the electrode are ever changing, as if the electrode were in fact rotated, as seen with reference to the locations of the segmental passages 62 and 64, so that the passages traverse the central portion of the workpiece hole to militate against the formation of a central plug due to trepanning. It should be noted that the greatest transverse depth of each segmental passage 62 or 64, represented by B in FIG. 4, cannot extend beyond the central axis 60, or stated another way, the inner bar 56 cannot be positioned within the outer tube in such as manner that both chordally extending edges of the bar lie to one side of the central axis 62.

In the form of the electrode 70 shown in FIGS. 8–13, the outer tubular member 72 is the same as the outer tubular member 56 previously described but the inner core member 74 is in the form of a solid bar which is substantially square in cross section and extends helically in the outer member with its corners 76 contacting the inner surface of the outer tubular member 72 at diametrically opposed points. Hence the inner core member 74 is coaxial with the outer tubular member whose coinciding central axes are shown at 78. It is to be understood that the cross-sectional shape of the member 72 can also be rectangular. Thus, four separate helical passages 80 for dielectric fluid are formed in the tubular member which generates, when the cross section is taken through the electrode, four segmental passages 82, 84, 86 and 88 between each side of the core member 74 and the corresponding inner surface of the outer tubular member 72. The largest depth of each such segmental passage, indicated as C in FIG. 9, cannot extend beyond the central axis 78, or stated another way, the total cross-sectional area of the inner core bar 74 cannot be confined in one semicircular cross-sectional area of the outer tubular member in such a manner that all four edges thereof are spaced radially to one side of the central axis 78. Of course, the use of any inner core member which is rectangular in cross section and in which the corners contact the inner wall of the outer tubular member will automatically provide segmental passages 82, 84, 86 and 88 none of which will have a large depth which will extend beyond the central axis.

In use as with electrode 24, the active end of the electrode 70 is consumed during the electroerosion process of forming hole H, and the position of the helical passages 80 around the central axis 78 change, as seen from FIGS. 10–13, as if the electrode were rotating to prevent formation of a central plug in the hole by trepanning.

In the form of the electrode 90 shown in FIGS. 14–19, here again the outer tubular member 92 is the same as the outer tubular member 24 but the inner core member 94 is a solid bar of triangular cross section which extends helically in the tube, the corners 96, 98 and 100 of which contact the inner surface of the outer tubular member 92. In the preferred form of core 94, its cross section is in the form of an equilateral triangle; hence its axis is coincident with the central axis 102 of the outer tubular member 92.

Three helical axially extending passageways 104 are formed which generate, when a cross section is taken through the electrode, three segmental passages 106, 108 and 110 between each side of the core member and the corresponding inner surface of the outer tubular member 92. It should be noted that while triangular cross sections of the inner core member 94 other than an equilateral triangle can be used, the largest depth of each segmental passage 106, 108 and 110, represented as D in FIG. 15, cannot extend beyond the central axis 102. Thus, a triangular cross section in which all of the corners contact the inner surface of the tubular member in one semicircular area thereof and with the radially innermost side of said triangle spaced from the central axis inwardly in said semicircular area would generate at least one segmental passage in cross section which extends beyond the central axis and would not entirely eliminate the formation of a central plug due to trepanning.

The use of the electrode 90 in the electroerosion apparatus and process illustrated in FIG. 1 is the same as that with electrodes 70 and 24 previously described. It will be seen that the position of the helical dielectric passages 104 relative to the central axis changes as the active end of the electrode is consumed, is shown in FIGS. 16–19, as if the electrode were rotating to eliminate the formation of a central plug due to trepanning.

It will be understood that in the electrode of the instant invention, a solid central helical core member of any cross-sectional shape, such as polygonal, having corners which contact the inner surface of the tubular member can be used thereby providing as many helical passages for dielectric fluid as there are sides to the polygon, which generate, when a cross section is taken through the entire electrode, segmental passages, none of which has a maximum depth which extends beyond the central axis of the electrode.

It should be noted that with regard to the electrode shown in FIGS. 2–7, the cross-sectional area of the core insert 58 can vary relative to the cross-sectional area of the outer tubular member 56. In so doing, one can obtain holes with bottoms which are substantially flat or V-shaped, as desired.

It should be further noted that the instant electrode can be mounted in the chuck 22 and the apparatus operated in such a manner that the electrode is rotated during the electroerosion operation. The instant electrode when so rotatably mounted provides more uniform erosion of the active end thereof, improved roundness of the hole formed, and better surface finish on the workpiece.

While preferred embodiments of the invention have here been shown and described, it will be understood that minor variations may be made without departing from the spirit of the invention.

I claim:

1. An electrode for forming holes in metal workpieces by electroerosion comprising an elongated member having an inactive end adapted for connection to electroerosion apparatus and an opposed active end and at least one internal through passage for dielectric fluid in said member from the inactive to the active end, said passage at least at the active end being helical and generating a segmental area when a cross section is taken through the entire member whose maximum transverse depth extends up to the central axis of said member as a maximum so that substantially no buildup of a central plug due to trepanning will occur as the active end of the electrode is consumed.

2. The electrode of claim 1 wherein said elongated member comprises an outer tubular member and an inner solid helical core member having diametrically opposed edge portions contacting the inner surface of said tubular member and sides spaced from the inner surface of said tubular member thereby forming at least two internal helical dielectric fluid passages.

3. The electrode of claim 2 wherein said inner helical core member is coextensive with said outer member.

4. The electrode of claim 2 wherein said inner helical core member is an elongated helical bar which extends diametrically of the outer member in a transverse direction so that a pair of said segmental areas are generated on both sides of said bar when a cross section is taken through said bar and outer tubular member.

5. The electrode of claim 4 wherein the thickness of said bar and that of said outer tubular member are substantially the same to produce a substantially cylindrical hole in said workpieces.

6. The electrode of claim 4 wherein said bar is polygonal in cross section whereby as many helical passages as there are sides to the polygon are formed which generate a multiplicity of said segmental areas when a cross section is taken through said polygonal bar and outer tubular member.

7. The electrode of claim 4 wherein said bar is triangular in cross section whereby three helical passages are formed which generate three of said segmental areas when a cross section is taken through said triangular bar and said outer tubular member.

8. The electrode of claim 4 wherein said bar is rectangular in cross section whereby four helical passages are formed which generate four of said segmental areas when a cross section is taken through said rectangular bar and said outer tubular member.

9. The electrode of claim 4 wherein said bar is square in cross section whereby four helical passages are formed which generate four of said segmental areas when a cross section is taken through said square bar and said outer tubular member.

10. Electroerosion apparatus comprising a hollow spindle, means to circulate dielectric fluid through said spindle, an electrode, means to removably secure said electrode to said spindle, a workpiece holder, and means applying a direct current between said electrode securing means and said workpiece holder to provide an erosion spark between the active end of said electrode and the workpiece, said electrode being an elongated member having at least one internal through passage therein for the dielectric fluid, said passage at least at the active end being helical and generating a segmental area when a cross section is taken through the entire member whose maximum transverse depth extends up to the central axis of said member as a maximum so that substantially no buildup of a central plug due to trepanning will occur as the active end of the electrode is consumed.

11. The combination of claim 10 wherein said elongated member comprises an outer tubular member and an inner solid helical core member having diametrically opposed portions contacting the inner surface of said tubular member and sides spaced from the inner surface of said tubular member thereby forming at least two internal helical dielectric fluid passages.

12. The combination of claim 10 wherein said inner helical core member is an elongated helical bar which extends diametrically of the outer member in a transverse direction so that a pair of said segmental areas are generated on both sides of said bar when a cross section is taken through said bar and outer tubular member.

13. The combination of claim 12 wherein said bar is polygonal in cross section whereby as many helical passages as there are sides to the polygon are formed which generate a multiplicity of said segmental areas when a cross section is taken through said polygonal bar and outer tubular member.

14. A method of forming holes in workpieces by electroerosion comprising retaining an electrode with its active end spaced from a workpiece, applying a direct current between the electrode and the workpiece to produce erosion sparks between the active end of the electrode and the workpiece, circulating dielectric fluid through the electrode and around the hole forming in the workpiece, and providing at least one internal helical passage in the electrode for the dielectric fluid which generates a segmental area when a cross section is taken through the entire electrode whose maximum transverse depth extends up to the central axis of the electrode as a maximum so that substantially no buildup of a central plug due to trepanning will occur as the active end of the electrode is consumed.

* * * * *